Patented May 6, 1941

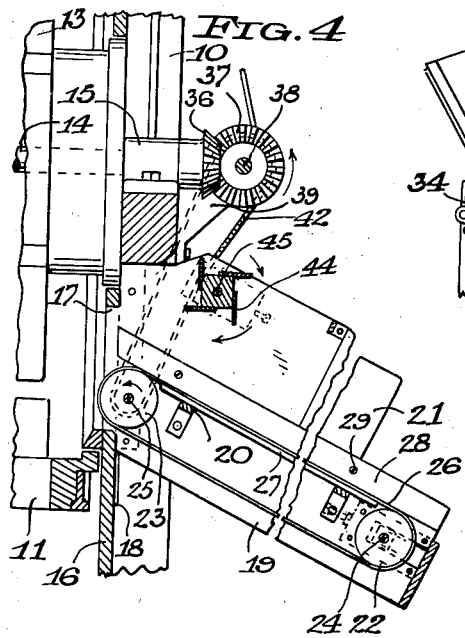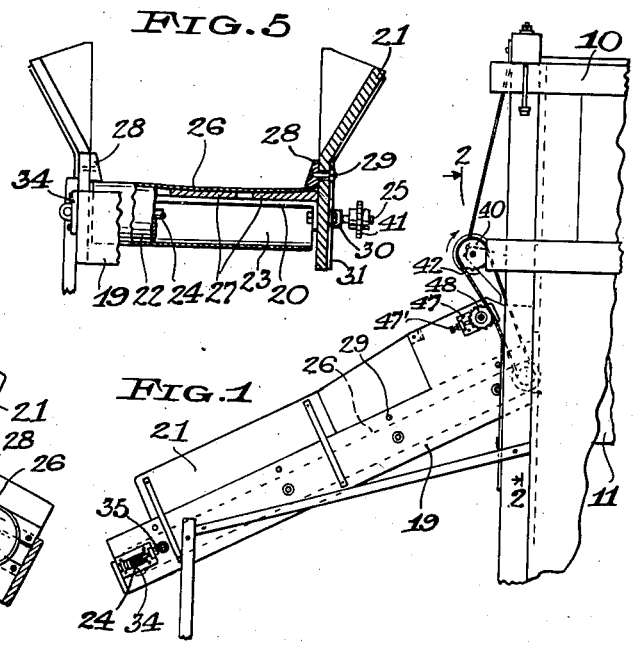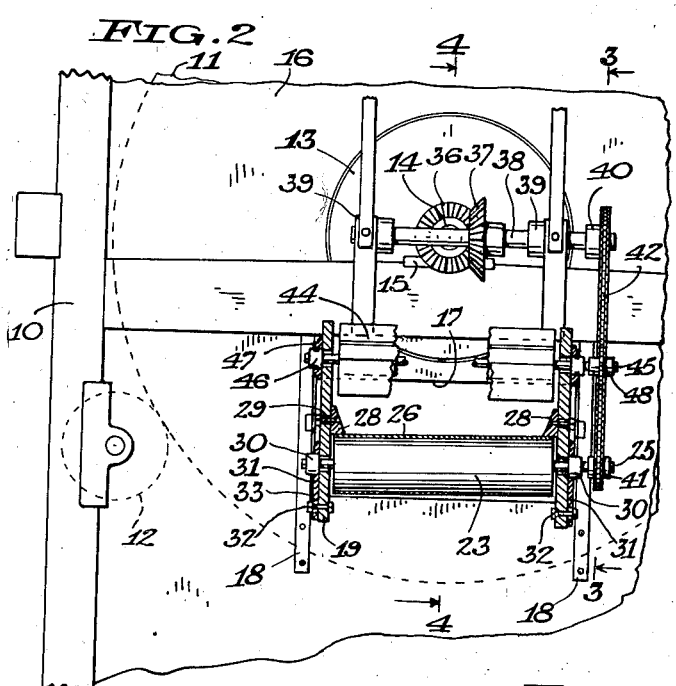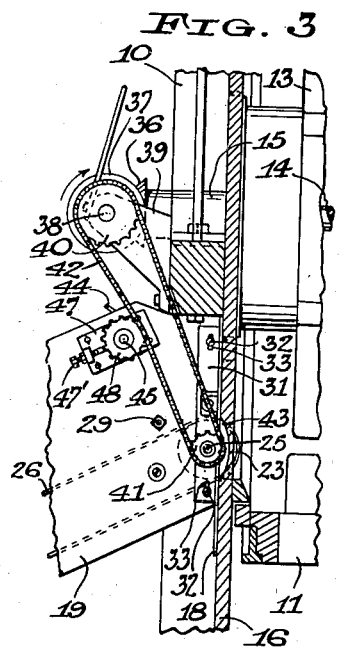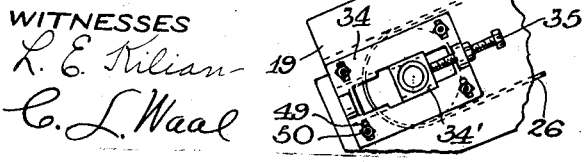

2,240,697

UNITED STATES PATENT OFFICE 2,240,697

VINER FEEDER

Frank Hamachek, Jr., Kewaunee, Wis., assignor to Frank Hamachek Machine Company, Kewaunee, Wis., a corporation of Wisconsin Application March 26, 1938, Serial No. 198,194

2 Claims. (Cl. 198—167)

The invention relates to feeders for viners, and more particularly to feeders of the belt type.

In the threshing of peas, lima beans, and the like, it is sometimes desirable to pass the vines or bushes through two viners in succession, the first viner doing some of the threshing and the second completing the work. This practice, known as tandem threshing, is followed to some extent in threshing peas and is quite common in threshing lima beans.

The pods of lima beans, in particular the Henderson Bush Variety commonly used for canning, do not mature evenly. The flavor of the beans that have matured sufficiently to be known as "whites," and which are white in color, is not as good as that of the young green beans, and it is found that the green beans have a higher commercial value than the white beans or than mixed white and green beans. In the tandem threshing of lima beans, the first viner, which is run at a relatively low speed, easily threshes out the white beans, while the second viner is run at a higher speed sufficient to thresh out the green beans. Normal yields can be obtained when the white beans constitute from 5 to 20 per cent. of the total, whereas, if threshing is attempted while all the beans are still green, the yield is only 50 to 60 per cent. of normal.

The feeding of the partly threshed beans from the first viner to the second has been somewhat of a problem. The ordinary chain feeder commonly used on viners is found to damage a considerable number of threshed beans, and wear is excessive because of the speed at which it is necessary to run the feeder chains to avoid clogging.

It has been found possible to obtain a higher feeding speed and to avoid damage to the partly threshed beans by using a conveyor belt without feeding slats or fingers. When using a conveyor belt, however, it is necessary to extend the discharge end of the belt into the feeding opening of the viner so that the material conveyed will not fall between the feeder and the adjacent viner wall. Because of the limited size of the feeding opening and the limited space between the inner and outer viner drums it is not possible to provide a sufficient crown on the pulley at the discharge end of the belt to keep the belt running true.

It is an object of the invention to provide an improved belt-type viner feeder which is capable of handling vine material at high speed and without danger of clogging or of damaging the peas or beans, and which has simple but effective means for mounting the feeding belt and for adjusting the belt so that it will run true.

Another object of the invention is to provide an improved but simplified drive for the belt which will also operate a rotary impeller associated with the feeder.

A further object is to utilize the rotary impeller as an adjustable tightener for the drive.

The invention further consists in the several features hereinafter described and claimed.

In the accompanying drawing, illustrating one specific embodiment of the invention, Fig. 1 is a side elevation of a viner feeder constructed in accordance with the invention;

Fig. 2 is a sectional elevation thereof taken generally along the line 2—2 of Fig. 1;

Fig. 3 is a sectional elevation taken generally along the line 3—3 of Fig. 2;

Fig. 4 is a sectional elevation taken generally along the line 4—4 of Fig. 2;

Fig. 5 is a view of the receiving end of the feeder, parts being broken away and parts being shown in section, and Fig. 6 is a detail side elevation of the receiving end of the feeder.

In the drawing, 10 designates the frame of a viner in which a suitably driven horizontal screen drum 11 is rotatably mounted by the usual supporting rollers 12, one being shown in Fig. 2. A suitably driven beater drum 13 is rotatable within the screen drum and is carried on a shaft 14 journalled in bearings 15 at the opposite ends of the frame, one of the bearings being shown. The feeding end of the viner frame has an apertured vertical end wall 16 through which the shaft 14 extends, this end wall having the usual rectangular feeding opening 17 below the shaft and higher than the lowest portion of the inner periphery of the screen drum, the opening communicating with the space between the beater drum and the screen drum. The feeding opening 17 is limited in size because of the nature of the machine. The end wall 16 is provided with reinforcing bars 18 adjacent to the sides of the feeding opening.

The lima bean vines or bushes are partly threshed in one viner, not shown, and are then conducted to the second viner, herein illustrated, by the feeder of the invention. The feeder has an inclined frame 19 including spaced side members 20, the upper end of the feeder frame being suitably mounted on the viner frame 10 adjacent to the feeding opening 17. Near the receiving end of the feeder the side members of the frame 19 carry inclined or flaring side boards 21. A cylindrical or drum pulley 22 is mounted at the receiving end of the feeder, and a similar pulley 23 is mounted at the discharge end of the feeder, the pulleys having respective shafts 24 and 25 which are substantially parallel and substantially horizontal. The pulley 23 is arranged near the lower portion of the viner feeding opening 17 and extends into the opening. Because of the limited height of the opening, the pulley diameter is relatively small. The pulleys are connected by a flat conveyor belt 26 having an inclined upper run or stretch which travels toward the feeding opening 17 and which rides on longitudinally extending supporting boards 27 carried on the cross bars 20. The side edges of the upper belt run may be raised slightly by the side boards 27, as indicated in Fig. 5, and are protected by guard strips 28 of wedge-shaped cross-section, wide edge down, adjustably secured by bolts 29 to the inner faces of the side members of the feeder frame, so as to prevent the material on the belt from entering between the belt edges and these side members. The upper run of the conveyor belt and the side members of the feeder frame define a feeding trough for the vine material.

The shaft 25 for the pulley 23 at the discharge end of the belt is journalled in suitable self-aligning bearings 30 carried by elongated vertical bearing brackets 31 which are secured by screws 32 to the outer sides of the side members 20 at regions adjacent to the end wall 16 of the viner, the screws passing through vertical slots 33 in the brackets so as to permit independent vertical adjustment of the brackets. The opposite ends of the shaft 24 for the pulley 22 at the receiving end of the belt are journalled in bearing brackets 34, hereinafter described, adjustably secured to the outer faces of the side members of the feeder frame 19, each bracket having a suitable shiftably mounted bearing member 34' adjusted by a screw 35. The pulley 22 is thus independently adjustable at opposite ends to adjust the belt and to take up belt slack.

The upper conveyor shaft 25 is driven from the same source of power as the viner. The beater drum shaft 14 carries a bevel gear 36 which meshes with a bevel gear 37 on a horizontal shaft 38. The latter shaft is journalled in bearing brackets 39 secured to the viner frame and carries a sprocket wheel 40 at one end. The conveyor shaft 25 carries a small sprocket wheel 41 which is connected to the sprocket wheel 40 by a driving chain 42, the end wall 16 of the viner being cut away at 43, Fig. 3, to provide clearance for the sprocket wheel 41.

To assist the entrance of the vine material into the viner opening 17 an impeller 44 in the form of a paddle-wheel fan is rotatably mounted above the discharge end of the conveyor and between the side members of the feeder frame. The impeller 44 is carried on a horizontal shaft 45 which is journalled in self-aligning bearings 46 on adjustably mounted bearing brackets 47 secured to the outer faces of the side members of the feeder frame, each bracket 47 being provided with a screw 47' to shift the shaft. The bearing brackets 47 are similar to the take-up bearing brackets 34 for the pulley shaft 24. One end of the impeller shaft 45 carries a sprocket wheel 48 which meshes with a run of the chain 42 at the outer side thereof remote from the viner so as to cause rotation of the impeller shaft in the proper direction, indicated by the arrows in Fig. 4. The shifting of the adjustably mounted impeller shaft serves to tighten the chain 42 to the desired tension, during assembly of the machine and also after wear or stretching of the chain and other parts has occurred, thus avoiding the necessity for any other chain tightening means.

The bearing brackets 34 at the receiving end of the feeder are provided with cross slots 49, Fig. 6, through which pass attaching bolts 50 so as to permit independent up-and-down adjustment of these brackets for changing the angularity of the idler pulley 22 in a direction transverse to the feeding run of the belt. The bearing members 34' are slidably guided on the brackets 34 in any usual manner for taking up belt slack, the path of belt-tensioning movement of the bearing members being parallel to the feeding run of the belt.

In setting up the machine for use, it may be found that the feeder belt 26 will creep laterally and rub on the side members of the feeder frame. In order to make the belt run true the relative angularity of the pulleys 22 and 23 is varied in a direction transverse to the feeding run of the belt. This is preferably accomplished by loosening the bolts 50 of one or both of the bearing brackets 34 and relatively shifting these brackets up or down, so as to change the angularity of the idler pulley 22 and to thereby warp the belt, the bolts being then tightened to retain the adjustment. The belt-warping adjustment of the bearing brackets 34 has no material effect on the belt tension and can readily be made while the feeder is in operation, rendering it unnecessary to stop the machine during a threshing run. In general, raising the end of the idler pulley toward which the belt creeps, or lowering the other end, or both, will cause the belt to run true. As an alternative, the pulley 23 at the discharge end of the feeder may be angularly adjusted by vertically shifting one or both of the bearing brackets 31. In Fig. 2, the right-hand end of the pulley 23 has been raised to effect such adjustment. In some instances, both pulleys may be angularly adjusted, but in opposite directions, so that only a slight adjustment will be required at each pulley end. Another way to change the relative angularity of the pulleys is to warp the feeder frame. This can be accomplished if the frame is not too rigid. In setting up or adjusting the feeder, the chain 42 may require tightening or loosening, and this is readily effected by shifting the impeller shaft 45 by one or both of the adjusting screws 47' of the bearing brackets 47.

In operation, the feeding belt 26 is driven at a suitable high speed, which can be several times greater than the speed of a viner feeder of the chain type. The high speed of the belt insures adequate feeding without requiring feeding slats or fingers, and the construction of the feeder avoids jamming or clogging of the mechanism by loose pods or fragments of the partly threshed lima bean vines or bushes, and avoids damage to the beans. The speed of the belt is sufficiently high to project or throw the vine material well into the viner, so that loose pods and vine fragments will not accumulate in the feeding end of the viner. Such accumulation is objectionable as in many instances it causes clogging of the machine and results in spoilage of the beans. The purpose of the impeller 44 is to create an air current for aiding the discharge of loose leaves from the belt and to assist with feeding of large bunches of vines. The rotating beater drum may produce an outward current of air through the feeding opening 17, but this will be counteracted by the air current produced by the impeller.

What I claim as new and desire to secure by Letters Patent is:

1. In a feeder, the combination of an endless conveyor having a feeding run, means for supporting said conveyor including a shaft adjacent to the discharge end of said feeding run, said shaft carrying a pulley about which the endless conveyor is trained for driving said conveyor, a drive shaft substantially parallel to said first-named shaft and at a higher elevation, sprocket wheels on said shafts, a chain connecting said sprocket wheels, a rotary impeller above said conveyor run and having a shaft parallel to said first-named shafts and at an intermediate elevation with respect to said shafts, the lower periphery of said impeller moving in the direction of said feeding run, a sprocket wheel on said impeller shaft meshing with a run of said chain and driven by said chain, adjustable mounting means for said impeller shaft shiftable substantially parallel to the plane of said chain and transversely of said chain run to take up chain slack and wear, and means for retaining said mounting means in adjusted position.

2. A viner feeder comprising, in combination, an endless conveyor belt having a feeding run, means for supporting said belt including pulleys at the opposite ends of said feeding run, a frame, bearing supports carried by said frame, bearing members for the opposite ends of one of said pulleys shiftably mounted on said supports for movement therein in a direction approximately parallel to said feeding run to adjust the tension on said belt, said supports being independently shiftable on said frame in a direction transverse to said feeding run to adjust the angularity of said last-named pulley and thereby prevent lateral creeping of the belt, and means for retaining said bearing supports in transversely adjusted position.

FRANK HAMACHEK, Jr.